United States Patent [19]

Voges et al.

[11] 4,312,325
[45] Jan. 26, 1982

[54] SOLAR HEATING SYSTEM

[75] Inventors: Kenneth Voges; Elroy A. Schoenbeck; Mark F. O'Hara; Thomas E. Schmitt, all of Red Bud, Ill.

[73] Assignee: Red Bud Industries, Inc., Red Bud, Ill.

[21] Appl. No.: 130,630

[22] Filed: Mar. 17, 1980

[51] Int. Cl.³ .............................................. F24J 3/02
[52] U.S. Cl. ................................... 126/423; 126/442; 126/450
[58] Field of Search ............... 126/450, 423, 442, 448; 138/44

[56] References Cited
U.S. PATENT DOCUMENTS

| | | | |
|---|---|---|---|
| 3,894,562 | 7/1975 | Moseley | 138/44 |
| 4,056,092 | 11/1977 | Meier | 126/450 |
| 4,067,317 | 1/1978 | Hubbard | 126/448 |
| 4,210,122 | 7/1980 | Artweger | 126/450 |
| 4,244,353 | 1/1981 | Straza | 126/432 |

Primary Examiner—Albert W. Davis
Assistant Examiner—G. Anderson

Attorney, Agent, or Firm—Graveley, Lieder & Woodruff

[57] ABSTRACT

A solar heating system includes an array of solar collectors and a manifold through which the collectors are supplied with water, this water being derived from a storage tank located below the collectors. The water is circulated through the collectors by a pump, and within the collectors the water is heated, but when the pump is not operating, the water drains from the collectors into the tank so it will not freeze and damage the collectors. Each solar collector includes a housing, a collector panel in the housing and containing a cavity through which water is circulated, supply and drain pipes which extend the full height of the housing behind the panel and are connected through ports with opposite ends of the panel cavity, and a light transmitting material over the housing. The supply and drain pipes of some of the collectors are plugged into corresponding supply and drain fittings on the manifold at bushings which fit into aligned ends of the pipes and fittings. The supply and drain pipes of other collectors are plugged into the supply and drain pipes of those collectors which are along the manifold, again the connections being at bushing.

35 Claims, 12 Drawing Figures

SOLAR HEATING SYSTEM

BACKGROUND OF THE INVENTION

This invention relates in general to solar heating and more particularly to a solar heating system for buildings, to the combination of a solar collector and manifold, to a collector panel itself, and to a method and apparatus for installing the collector in a position suitable for absorbing energy from the sun's rays.

With the dramatic increase in the cost of fossil fuels, particularly heating oil and natural gas, the heating industry has turned to solar energy as a less expensive means for satisfying the heating requirements of buildings. A wide variety of solar heating systems, and particularly collectors for such systems, have been developed in recent years. Most are quite expensive, difficult to install, and once in use create a multitude of maintenance problems.

The typical solar heating system includes several collectors that are positioned such that the sun's rays impinge upon them. These collectors contain fluid passages that terminate at suitable fittings. The collectors are normally manufactured at a central facility and then shipped to the construction site where they are connected together with pipe much in the same manner that a plumber connects conventional plumbing fixtures into a household plumbing system. This field installation is expensive. Moreover, the heat transfer fluid which flows through collectors and the associated piping is usually exposed to only a relatively small heated area, for the passageways to which it is confined are usually behind only a small proportion of the actual area that is heated. Also the heat transfer fluid is usually water or an antifreeze. Water will freeze and destroy the collectors and piping system unless provisions are made to completely drain the collectors and associated piping when the collectors are not collecting heat. Antifreeze is somewhat expensive in its own right, and tends to undergo chemical change at the elevated temperatures which are often encountered during summer months. In addition, special precautions must be taken to insure that the heat transfer fluid containing the antifreeze does not escape into the water and forced air systems of the building, for many antifreezes are toxic. This precludes the use of single wall heat exchangers.

Aside from the foregoing, most solar energy systems of present development utilize specially constructed heat reservoirs which are to a large measure permanent built-in installations. For example, some take the form of rock beds to which the heat from the heat transfer fluid is dissipated. Usually air from the forced air heating system for the building is directed through the rock beds to extract the heat from the rocks and thereby elevate the temperature of the air. Rock beds require special pits that must be dug either adjacent to the building that is to be heated or within its basement, the latter being normally practical for only new construction. This is an expensive procedure. Furthermore, the bed being within the ground, absorbs ground moisture and becomes moldy, and this imparts a musty odor to the air that is forced through the bed. Also the beds attract insects and other creatures, such as snakes, all of which have no place in a good ventilating system. Other reservoirs take the form of large water tanks which are normally installed during the construction of the building. These tanks are expensive and difficult to service. Moreover, they will in time deteriorate to the extent that they are no longer operable, yet because of their size they cannot be removed from the building without being cut apart. In most instances the water tanks are cylindrical. When outdoors they appear unsightly and are difficult to insulate. When indoors they do not utilize the available space efficiently.

Furthermore, it is not uncommon to find a large number of pumps and flow control valves in solar heating systems of present manufacture. These pumps add significantly to the initial cost of these systems, not to speak of the maintenance problems that they subsequently create. The valves, which are supposed to distribute the heat transfer fluid evenly to all collectors, are difficult to adjust and often do not adequately serve the purpose for which they are installed.

SUMMARY OF THE INVENTION

One of the principal objects of the present invention is to provide a solar heating system that is highly efficient, inexpensive to install, and virtually maintenance free. Another object is to provide a system of the type stated having components which will easily fit into a typical basement, utility room, or garage. A further object is to provide a heating system of the type stated having solar collectors which are merely plugged into a manifold or into one another, thereby eliminating the need for installing a considerable amount of piping in the field. An additional object is to provide a system of the type stated which uses non-toxic water as the heat transfer fluid and thereby avoids any possibility of contaminating the building air or water systems. A further object is to provide a system of the type stated in which the water heat transfer fluid drains out of the collectors and other regions where it might freeze when the water is not being used to transfer heat. Still another object is to provide collector panels and collectors in which the heat transfer fluid and the surface at which the sun's rays are absorbed are separated by an extremely thin section of highly conductive metal, thereby providing maximum exposure of the heat transfer fluid to the absorbed energy. Still another object is to provide a tower for conveniently mounting the collectors for exposure to the sun's rays. Yet another object is to provide method and apparatus for quickly connecting the collectors to the piping system and otherwise mounting it in a fixed position suitable for absorbing the sun's rays. These and other objects and advantages will become apparent hereinafter.

DESCRIPTION OF THE DRAWINGS

In the accompanying drawings which form part of the specification and wherein like numerals and letters refer to like parts wherever they occur

DETAILED DESCRIPTION

Referring to the drawings (FIGS. 1 and 2), A designates solar heating system for supplying at least some of the energy needs for a building B. Like most other buildings, the building B includes a furnace 2 for heating the air within it so as to maintain that air at a comfortable temperature, and the furnace 2 may be of the forced air variety, in which case it will be connected to ductwork 4 and will contain a fan unit 6 or air handler for circulating air through the ductwork 4. In addition, the building A includes a hot water heater 8 that is connected through piping with various plumbing fixtures throughout the building A for supplying hot water to those fixtures. The heater 8 may derive its heat from a resistance type heating element or gas burner.

The solar heating system A uses water throughout as its heat transfer medium or fluid, and that water need not contain an antifreeze solution. In fact, it is preferable that it does not. Basically, the system A includes (FIGS. 1 and 2) several solar collectors 10, a manifold 11 to which the collectors 10 are connected, either directly or indirectly, a storage tank 12, and a collector pump 14 for pumping the water through the manifold 11 and into the collectors 10 at low pressure, normally below 8 lbs/in$^2$. The water is delivered through the manifold 11 to the collectors 10 where it is heated and the heated water returns through the manifold 11 to the tank 12. In addition, the system A includes a fan coil 16 that is located in the airstream generated by the fan unit 6 of the furnace 2, a water preheater 18 that is located in series with the hot water heater 8 of the building B, so that the cold tap water flows first through the preheater 18 and then into the hot water heater 8, and a heating pump 20 for directing hot water from the storage tank 2 to either the coil 16 or the preheater 18, depending on the setting of valves 22 and 24 which are located in the lines leading to the fan coil 16 and preheater 18, respectively, and also form part of the system A.

The solar collectors 10 should face south, at least when located in the northern hemisphere, and generally should be inclined somewhat, with the angle to the horizontal being preferably about 15° plus angle of the latitude along which the collectors 10 are located. If a gable, hip, or other inclined roof 26 (FIG. 2) is available, the collectors 10 may be fastened directly to it along with the manifold 11, provided of course that it has a southwardly presented surface. This positions the collectors 10 and manifold 11 above the tank 12, so that in the absence of circulation provided by the pump 14, the water in the collectors 10 and manifold 11 will drain into the tank 12.

Otherwise the collectors 10 and manifold 11 may be mounted upon a tower 28 (FIGS. 1 and 3) which elevates the collectors 10 to permit maximum exposure to the sun. This also reduces the risk of damage to the collectors 10, and when the storage tank 12 is outdoors, presents the collectors 10 high enough to enable water within them to drain by gravity into the tank 12.

The tower 28 includes (FIG. 3) at least two posts 30, and usually more, all arranged in an east-west line. At the top of each post 30 is a bearing plate 32 from which guy wires 34 extend to stabilize the posts 30. The bearing plates 32 further support frames 36 on which the collectors 10 and manifold 11 are actually positioned, there being a separate frame 36 in each of the spaces between the posts 30. Each frame 36 includes side trusses 38 located adjacent to the posts 30 and the end trusses 40 which extend horizontally between the ends of the side trusses 38, and in addition center truss 42 which extends between the centers of the two side trusses 38. The trusses 38, 30, and 42 are all arranged such that their long straight members lie in the same plane, which is considered the front of the frame 36. At the midpoint of the side trusses 38, that is in the regions where the center truss 42 is joined to the side trusses 38, the side trusses 38 have trunnions 44 which project outwardly into the bearing plates 32. This permits the frames 36 to pivot relative to the posts 30 about a horizontal axis. The frames 36 further include cross bracing 46 which extends between the center truss 42 and the two end trusses 40. Each frame 36 is held at the desired angle with respect to the horizontal by an adjustable bracket 48 which extends between the frame 36 and one of the posts 30 that supports it, and thereby holds the frame at a predetermined inclination.

Each collector 10, irrespective of whether it is mounted upon a frame 36 of the tower 28 or upon the roof 26, consists of (FIG. 5) a housing 50 that is preferably formed in a rectangular configuration from a light weight metal such as aluminum sheet and includes a back wall 52, side walls 54, and end walls 56. The length of the housing 50 corresponds to the spacing between the end and center trusses 40 and 42 on the tower frames 36, so that when installed upon the tower 28 one end of the housing 50 will be over an end truss 40, while the opposite end will be over a center truss 42. The side and end walls 54 and 56 for the housing 50 are joined firmly together and the center of the back wall is rigidified by a center brace 58 which may be an aluminum angle. Along its end walls 56, the housing 50 is provided with outwardly directed mounting brackets 60 which lie generally in the plane of the back wall 52 and are capable of being attached to the end and center trusses 40 and 42 of one of the frames 36 on the tower 28 or to the surface of the roof 26 by fastening devices such as screws. Near each corner of the housing 50, the end walls 56 are rigidified on their inside faces with corner brackets 62 having apertures 64 which align with corresponding apertures 64 in the end walls 56. The side and end walls 54 and 56 of the housing 50 are lined with a light weight insulation material 66 and likewise and back wall is lined with an insulation material 68. The insulation materials 66 and 68 may be bats composed of glass fibers.

Figure 5:
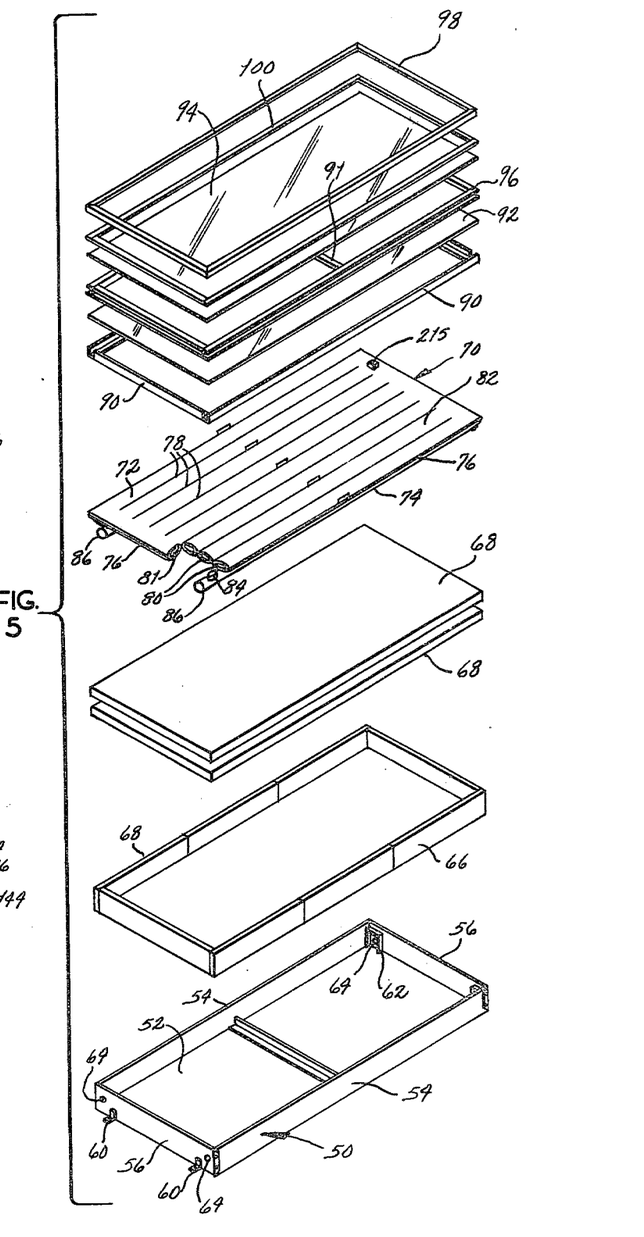
FIG. 5 is an exploded perspective view of a solar collector constructed in accordance with the present invention, with the collector panel being partially broken away and in section to show the channels within it.

The housing 50 contains a collector panel 70 which lies over and rests on the insulation material 68. When so positioned the collector panel 70 is isolated from the back wall 52 of the housing by the insulation material 68 and from the side and end walls 54 and 56 by the insulation material 66.

The collector panel 70 includes (FIG. 5) front and back sheets 72 and 74 of a suitable metal such as aluminum which are identical except that the back sheet 74 has apertures near two of its corners. The sheets 72 and 74 are joined together along their edges by a peripheral weld 76 which produces an impervious bond between the two sheets 72 and 74 around the entire periphery of the panel 70. The peripheral weld 76 may be a so-called TIG weld. Between the two side edges of the panel 70 the sheets 72 and 74 are further joined together by intermediate welds 78 which are equally spaced from one another and may be formed with a resistance-type seam welding machine. The intermediate welds 78 may extend parallel to the side edges of the panel 70 and terminate short of the end edges. The intermediate welds 78 need not be continuous, but even so should not impart any perforations to the sheets 72 and 74. The two sheets 72 and 74 are spread apart a maximum distance of about ¼ to 1 inch in those areas where they are not joined together by the peripheral weld 76 or intermediate welds 78, thereby providing a series of longitudinal channels 80 through the panel 70 and a pair of transverse channels 81 at the ends of the panel 70. The forwardly presented surface of the front panel 72 is covered with a black coating 82 that is capable of absorbing energy from the sun's rays. In lieu of running the intermediate welds 78 lengthwise in the panel 70, they may be run crosswise in which case they will terminate short of the side edges for the panel. Also a series of spot welds may be substituted for the intermediate welds 78.

Figure 7:
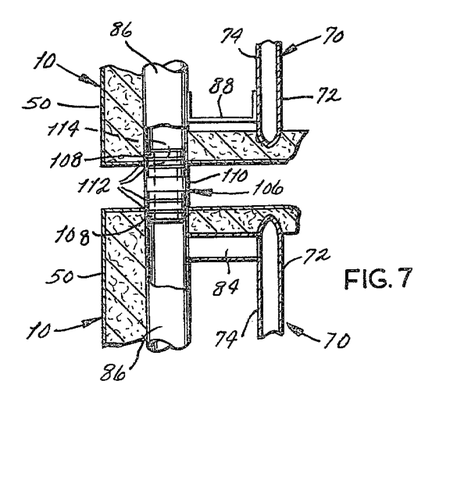
FIG. 7 is a sectional view taken along line 7—7 of FIG. 3 and showing the coupling bushing by which the drain pipes of two adjacent panels are connected together.

Along each of its end edges, the back sheet 74 of the panel 70 is connected by a short tubular port 84 (FIGS. 5, 7 and 8), with the two ports 84 being set slightly inwardly from diagonally opposite corners of the sheet 74. The hollow interiors of the two ports 84 open into the transverse channels 81 of panel 70. When the collector 10 is mounted in an operative position on the tower 28 or roof, one of the ports 84 will be at a higher elevation than the other. The lower port 84 constitutes the inlet or supply port for the collector panel 70, while the upper port 84 is the outlet or drain port. Each of the ports 84 is also connected to a separate pipe 86 that extends the full length of panel 70 parallel to its side edges. The pipes 86 are secured firmly to the panel 70 by their respective ports 84 as well as by mounting brackets 88 (FIG. 7), with the port 84 for each pipe 86 being located at its one end and the mounting bracket 88 being at its opposite end. Thus the pipes 86 are positioned firmly behind the sheets 72 and 74 of the panel 70, and when so positioned, they align with the apertures 64 in the end walls 56 and in the corner brackets 62 of the housing 50. The interiors of the ports 84 and their respective pipes 86 are in communication so that the pipe 86 connected with the lower or inlet port 84 becomes the supply for the panel 70, whereas the pipe 86 connected to the upper or outlet port 84 becomes the drain.

To fabricate the panel 70, the two sheets 72 and 74 are brought against each other in a perfectly flat condition and are joined together along their edges by TIG welding to produce the peripheral weld 76. Next the intermediate welds 78 are formed with a resistance-type seam welder. Thereafter, the pipes 86, after having the ports 84 and brackets 88 welded to them, are welded to the back sheet 74 at the ports 84 and brackets 88, with the ports 84 overlying the apertures in the back sheet 74. Thereupon one of the pipes 86 is completely plugged, while the other is connected to a source of compressed air, but before any pressurized air is applied, the sheets 72 and 74 are placed in a confining device (not shown) which prevents the sheets 72 and 74 from spreading more than a predetermined distance apart. Next the pressurized air is applied, usually under no greater pressure than about 50 lbs/in$^2$, and this air spreads the sheets 72 and 74 apart in the regions where they are not joined by the welds 76 and 78, thereby producing the channels 80 and 81. Finally, the completed panel 70 is laid into the housing 50 with its front sheet 72 exposed, and with its pipes 86 immersed in and its back sheet 74 resting on the insulation material 68.

Outwardly from the collector panel 70, a side and end liner 90 (FIG. 5) is installed within the housing 50, and it is actually four angles, each having one of its flanges secured to a side or end wall 54, 56, preferably with rivets, and the other of its flanges directed inwardly over the front sheet 72 of the panel 70. The two side liners 90, moreover, are connected by a cross member 92 which prevents the collector panel 70 from distorting when heated by the sun.

The inwardly directed flanges of the side and end liner 90 support two lights 92 and 94 of solar glass, with these lights 92 and 94 being spaced apart by the separator 96 that lies along the side and end walls 54 and 56 of the housing 50. The two lights 92 and 94 of glass, as well as the separator 96, are retained in the housing 50 by a retaining rim 98 which fits around the side and end walls 54 and 56 of the housing 50 and has a lip which projects inwardly over the edge of the light 94. Interposed between the lip of the rim 98 and the outer light 94 is a seal 100 to prevent air and moisture from entering the housing 50. Actually more or less than two lights 92 and 94 may be used. For example, in warm climates only one light may be necessary, whereas in severly cold climates three may be desirable.

Figure 4:
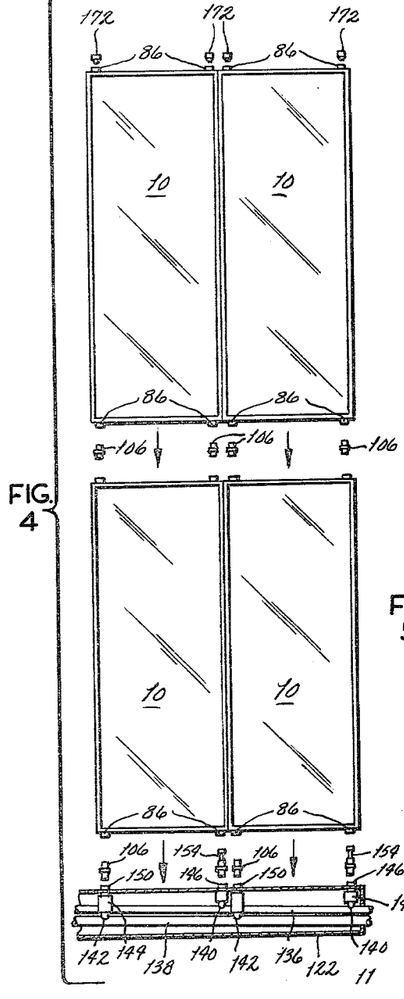
FIG. 4 is an exploded elevational view showing several collectors of an array and the manifold through which those collectors are supplied and drained, with the manifold being broken away and in section, and further showing bushings for connecting adjacent collectors together and also for connecting the lowermost collectors to the manifold.

All of the solar collectors 10 are identical, and since each has supply and drain pipes 86 extending its full height, with the ends of the pipes 86 exposed and accessible at the ends of the collector housing 50, two or more collectors 10 may be joined together end to end in a column (FIG. 4). This is accomplished by fitting simple coupling bushings 106 (FIG. 7) into the ends of aligned pipes 86 for two collectors 10. Each coupling bushing 106 has two end portions 108 which are small enough to fit into the interiors of the pipes 84 and an enlarged shoulder portion 110 between the two end portions 108. Moreover, the end portions 108 are provided with grooves into which O-rings 110 fit to form fluid-tight seals between the bushing 106 and the interior surfaces of the pipes 94. In this regard, the pipes 86 should have smooth interior surfaces, as is typical of conventional aluminum tubing. Each bushing 106 has a bore 114 extending completely through it from one end to the other.

Figure 3:
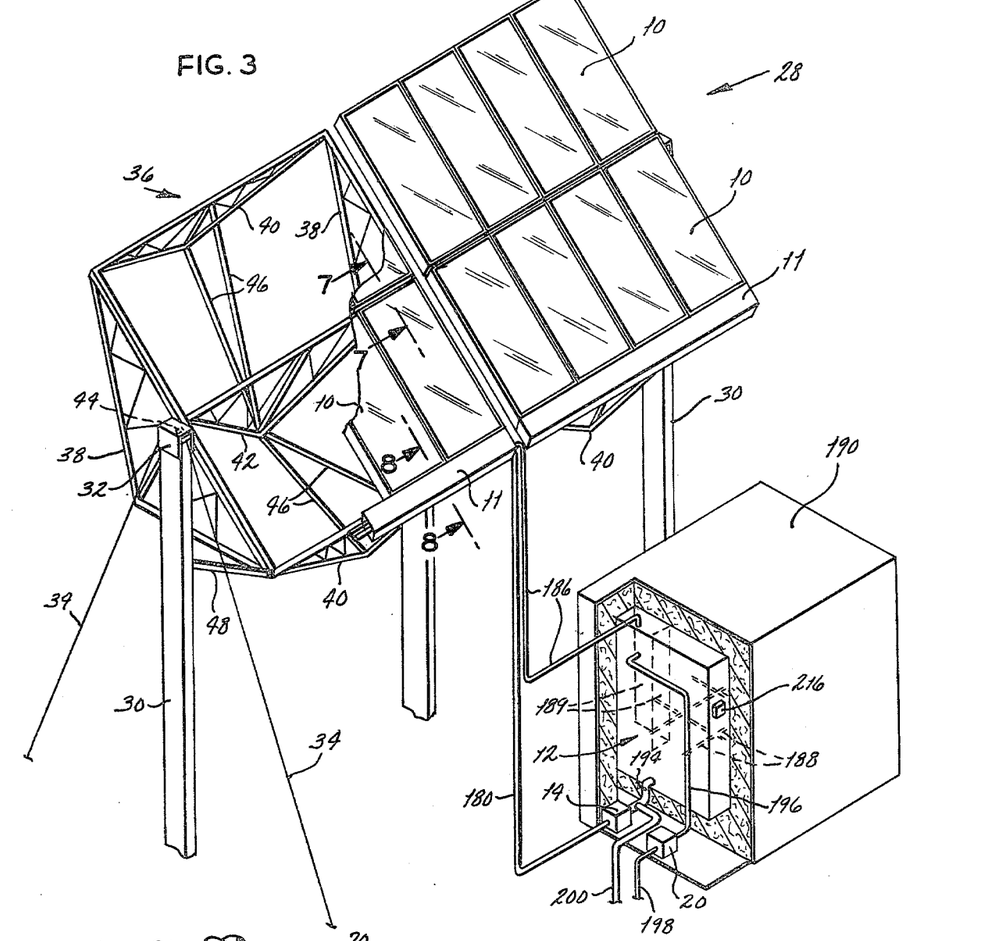
FIG. 3 is a perspective view showing a tower having a manifold and an array of solar collectors mounted upon it and also showing a storage tank and cabinet, with the latter being broken away and in section.

The individual collectors 10 receive water from and likewise return it to the storage tank 12 through the manifold 11 to which the pipes 86 of the lowermost collectors 10 in any column are connected. More than one manifold 11 may be required for the system A. The manifolds 11 may be installed upon the roof 26 or upon the tower 28, and in the latter case each manifold 11 will normaly be secured to the lower of the two end trusses 40 and will extend the full length of that truss 40 (FIG. 3).

Figure 6:
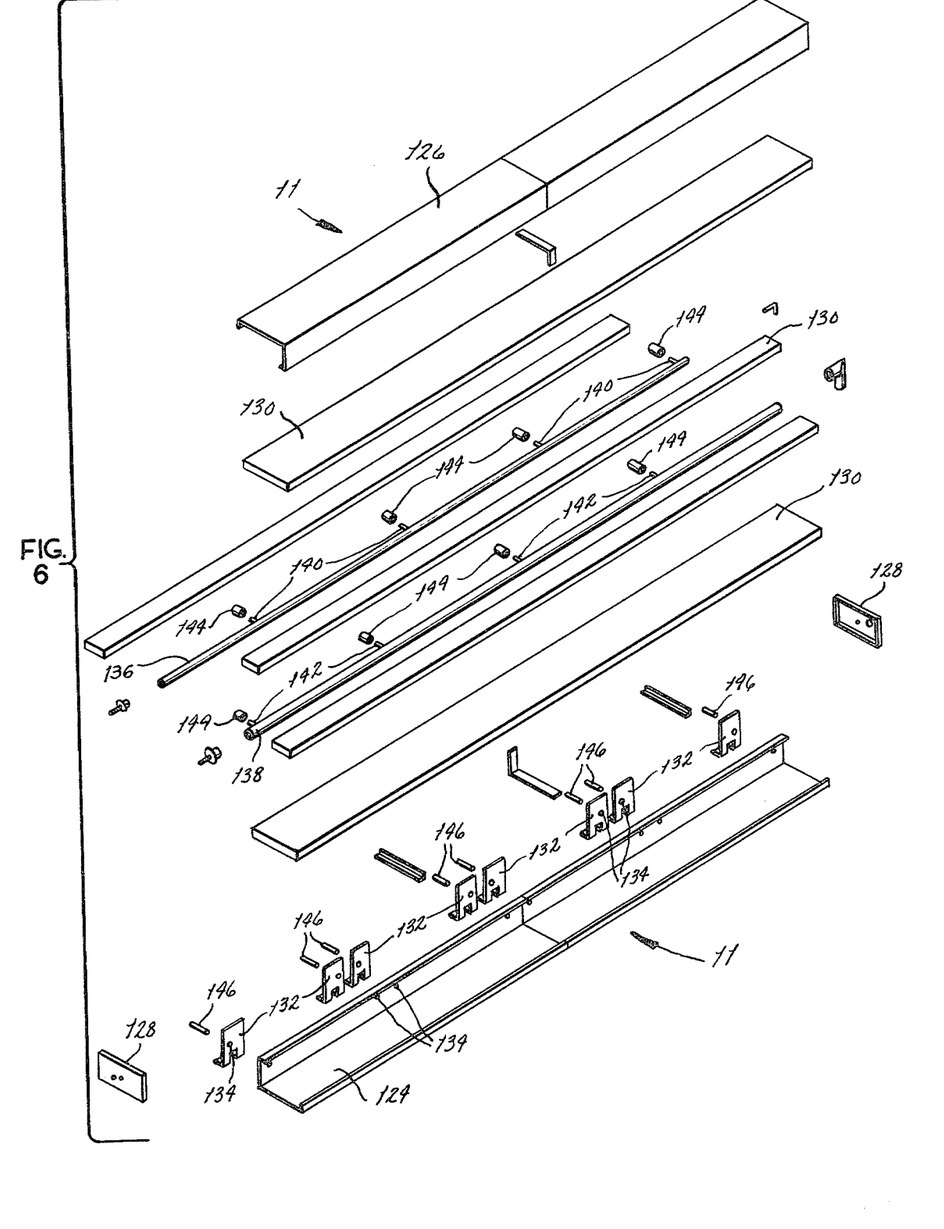
FIG. 6 is an exploded perspective view of the manifold forming part of the present invention.

Each manifold 11 consists of (FIG. 6) a manifold housing 122 having a right angle front member 124 and a right angle rear member 126 which are joined together in a rectilinear configuration which is closed at its ends by end caps 128. Each interior surface of the housing members 124 and 126 is lined with a bat of insulation material 130. The rear member 124 of the housing 122, along its narrower wall, is furthermore fitted with mounting brackets 132 which project outwardly and enable the entire manifold 11 to be secured to the roof 26 or to the lower end truss 40 on a frame 36 for the tower 28. The brackets 132 further extend forwardly beyond the front face of the manifold housing 122. The rear member 126 and overlying brackets 132 are further provided with apertures 134 that are arranged in pairs with the spacing between the apertures 134 of any pair being equal to the spacing between the two pipes 86 of any collector panel 70.

Located within the housing 122 is a pressure pipe 136 and a return pipe 138 (FIGS. 4 and 6), the latter being somewhat larger in diameter than the former to permit free drainage of water from the collectors 10. The two pipes 136 and 138 extend for the full length of the housing 122 from one end cap 128 to the other, and while they are parallel to each other, they are not parallel to the narrower walls of the housing 122. On the contrary, the pipes 136 and 138 slope downwardly toward one end of the housing 122 and it is at this end where the pipes 136 and 138 are connected with more piping that leads to the storage tank 12. The pressure pipe 136 has tube-like ports 140 which project from it and these ports generally aligns with one of the apertures 134 of each pair in the rear member 124. The pipe 138 also has a tube-like ports 142 projected from it, but these ports generally align with the other apertures 134 and each pair in the rear member 124. Fitted over each port 140 on the pressure pipe 136 is an elastomeric sleeve 144, and each sleeve 144 in turn receives a supply fitting 146 which projects through the aperture 134 with which its port 140 aligns. Similarly each port 142 in the return pipe 138 is fitted with an elastomeric sleeve 144 which in turn receives a drain fitting 150 that projects through the aperture 134 with which its port 142 aligns. Both the supply and drain fitting 146 and 150 are formed from the same type of tubing as are the pipes 86 that are along the backs of the collector panels 70. The elastomeric sleeves 144 by which the fittings 146 and 150 are joined to the pipes 136 and 138 accommodate differential thermal expansion.

It will be recalled that the manifold 11 extends along the bottom of an array of collectors 10 (FIG. 4), with the collectors 10 in the array being arranged in columns and tiers, and the collectors 10 of each column being connected together at their supply pipes 86 and drain pipes 86 by the bushings 106. Moreover, the spacing between pairs of supply and drain fittings 146 and 150 on the manifold 11 corresponds to the spacing between the supply and drain pipes 86 on the collectors 10, and indeed the collectors 10 are positioned on the tower 28 or the roof 26 with their supply and drain pipes 84 aligned with supply fittings 146 and drain fittings 150, respectively, for the manifold 11. The drain pipes 86 of the lowermost collectors 10 in each column are connected to the drain fittings 150 with which they align by means of more coupling bushings 106. The supply pipes 86 of the lowermost collectors 10 are, on the other hand, connected with the supply fittings 146 of the manifold 11 by metering bushings 154 which serve to maintain a uniform pressure within the pressure pipe 136 of the manifold 11 and further distribute the pressurized water evenly to all of the collectors 10 in the array.

Each metering bushing 154 includes (FIG. 8) a lower portion 156 and an intermediate portion 158 which are of the same diameter and are separated by an enlarged shoulder portion 160. In addition, the bushing 154 has an upper portion 162 that has the same diameter as the lower and intermediate portions 156 and 158 and is joined to the intermediate portion 158 through a reduced connecting portion 164 that imparts a spool-like appearance to the bushing 154. All of the portions 156, 158, 160, 162, and 164 are coaxial, and extended through them, is a center bore 166 which opensout of the lower portion 156. The connecting portion 164 furthermore contains an orifice 168 that opens into the center bore 166 so that water can flow out of the center bore 166 at a metered rate and into the space surrounding the connecting portion 164. The upper portion 162 contains another orifice 169 through which the center bore 166 opens axially out of that end of the bushing 154. The lower, intermediate and upper portions 156, 158, and 162, as previously noted are the same diameter and that diameter is slightly less than the inside diameter of the tubing from which the pipes 86 for the collectors 10 and the supply fittings 146 of the manifold 11 are formed. Each of the portions 156, 158 and 162 are provided with outwardly opening grooves into which O-rings 170 are fitted.

Figure 8:
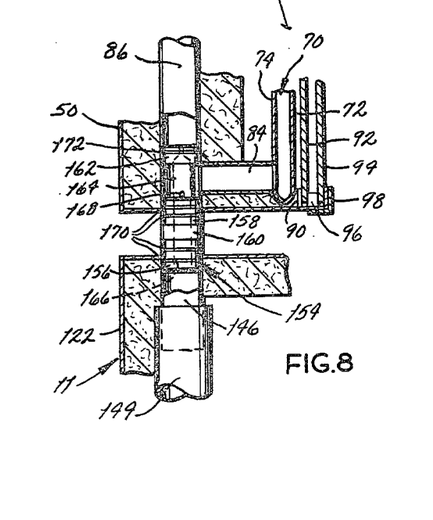
FIG. 8 is a sectional view taken along line 8—8 of FIG. 3 and showing the metering bushing by which the supply pipe for the lowermost collector is coupled with the manifold.
Figure 9:
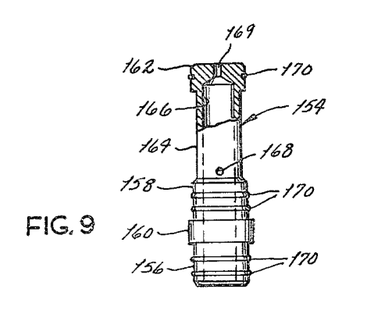
FIG. 9 is an elevational view partially broken away and in section of the metering bushing.

The lower portion 156 of each bushing 154 fits into a supply fitting 146 of the manifold 11, whereas the upper portion 162 and intermediate portion 158 fit into the supply pipe 84 of the aligned collector 10 such that the ends of the fitting 146 and pipe 86 are against the shoulder portion 160. When the metering bushing 154 is so disposed, the intermediate portion 158 lies below the inlet port 84 for the pipe 86, whereas the upper portion 162 is above the inlet port 84. In effect, the intermediate and upper portions 158 and 160 isolate the inlet port 84 from the remainder of the supply pipe 86, so that all of the water that enters the collector panel 70 of the lower collector 10 flows through the radial orifice 168 in the metering bushing 154. Similarly, all of the water that enters that portion of the pipe 86 which is beyond the port 84 flows through the axial orifice 169.

The orifices 168 and 169 in each of the metering bushing 154 are in combined area somewhat smaller in diameter than the bore 114 through the coupling bushing 106, and this of course serves to prevent a back pressure from developing in the drain pipes 86 and the collector panels 70. It further serves to restrict the flow of water into the supply pipes 86 of the collectors 10, which in turn maintains a uniform pressure throughout the length of the pressure pipe 136 in the manifold 120. As a consequence, the rate of flow through each metering bushing 154 and the column of collectors 10 associated with it will be about the same. The diameters of the orifices 168 and 169 for the metering bushings 154 will to a large measure depend on the number of collectors 10 connected with the manifold 120, the capacity of the collector pump 14, the number of collectors 10 in each column, and the angle at which the collectors 10 is disposed. These diameters should be such that the rate of flow of water through each collector panel 70 is about the same. In effect, the orifice 168 meters water to the collector panel 70 in which it is located, whereas the orifice 169 meters water to the next higher collector panel 70. The latter orifice may be eliminated and the bore 166 extended to the end of the bushing 154, but in that instance another metering bushing 154 should be at the next higher panel 70.

Where more than two collectors 10 exist in any column, all but perhaps the upper two should be connected together at their supply pipes 86 by other metering bushings 154 and the diameters of the orifices 168 and 169 in these bushings 154 will be different from the bushings 154 at the manifold 11 and will vary depending on the height or tier above the manifold 11. The supply and drain pipes 86 for the uppermost collector 10 in any column are closed at their upper ends by plugs 172 (FIG. 4) which fit into and seal with the pipes 84 much like the bushings 106.

The lower end of the pressure pipe 136, where it emerges from the manifold housing 122 is connected with a supply line 180 (FIG. 3) that leads to the discharge port of the collector pump 14 which should have a pressure regulating device at its discharge port to control the head at which the water is released to the supply pipe 180 and pressure pipe 136. Preferably this device is preset by the supplier of the system A. Of course, the head shoulder be sufficient to lift the water to the top of the uppermost collector 10, but it should not be much greater. Indeed, excessive pressures should be avoided since the forces developed by them on the collector panels 70 tend to distort and damage the panels. The pump 14 should be a centrifugal pump which, when not in operation, permits water to drain through it into the tank 12.

The lower end of the return pipe 138, where it emerges from the manifold housing 122, is on the other hand, connected with a return line 186 that connects with the upper end of the storage tank 12.

Figures 1, 2:
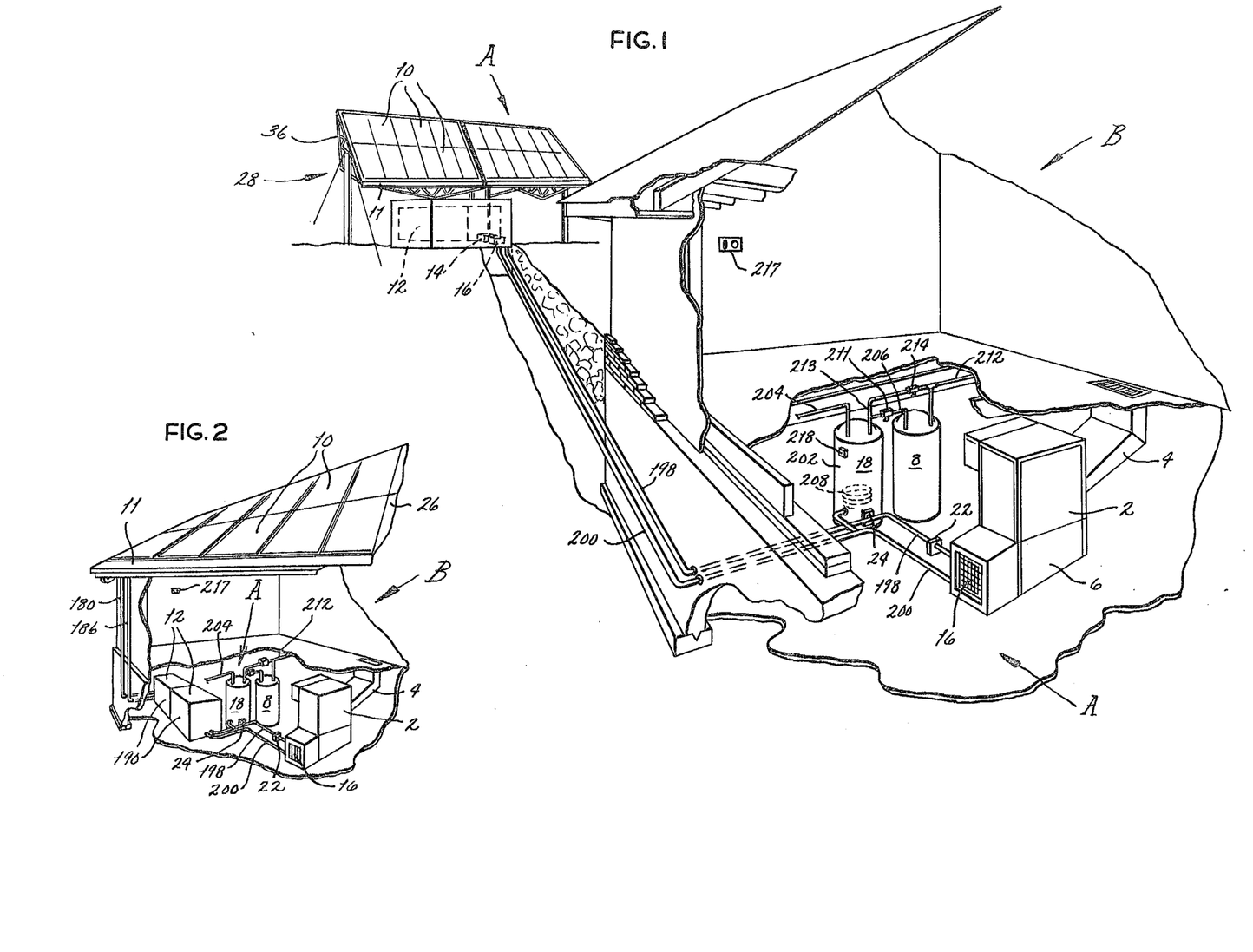
FIG. 1 is a perspective view, partially broken away and in section, of a building having some of its heating needs supplied by the solar heating system of the present invention, the collectors of the heating system being mounted upon a tower and the storage tank of the system being located outdoors.
FIG. 2 is a perspective view similar to FIG. 1 but showing the collectors and the manifold through which they are supplied with water installed upon the roof of the building, and the storage tank located within the building.

The storage tank 12 has a box-like configuration, and as such has rectangular side, top and bottom walls. The side walls are held together intermediate their end by cross straps 188 which extend through the interior of the tank and enable it to withstand the pressure of the water within it. Also, where the return line 186 from the manifold 11 enters the tank 12, the tank 12 is provided with an internal baffle 189 that tends to isolate the warm water returned from the collectors 10 to one small region of the tank 12. The tank 12 is housed within a cabinet 190 (FIG. 3) that also contains a layer of thermal insulation 192 which surrounds the tank 12. The cabinet 190 likewise possesses a box-like configuration which is relatively simple to construct and lends itself ideally to the containment of the insulation 192. Moreover, it is aesthetically pleasing. The tank 12 and its cabinet 190 may be located either outdoors (FIGS. 1 and 3) or indoors (FIG. 2). When the tank 12 is located outdoors, the cabinet 190 also houses the collector pump 14 and the heating pump 20 which are connected to the tank 12 through short suction lines 194 and 196, respectively (FIG. 3). However, either one or both of the pumps 14 and 20 may be located indoors also. The suction line 194 for the collector pump 14 is at the bottom of the tank 12 where it enables the pump 14 to draw the coldest water from the tank 12. The suction line 196 for the heating pump 20, on the other hand, connects to the upper end of the tank 12 at the region isolated by the baffle 189, so that the heating pump 20 draws the warmest water from the tank 12.

The discharge port of the collector pump 14 is connected with the supply line 180 that leads to the pressure pipe 136 of the manifold 11, whereas the discharge port for the heating pump 20 is connected to a feed line 198 (FIG. 1) that leads to the fan coil 16 and the water preheater 18, branching into each one of them. The valve 22 is located within that branch of the feed line 198 that leads to the fan coil 16, whereas the valve 24 is located in that branch that leads to the preheater 18. The fan coil 16 and water preheater 18 are also connected to the tank 12 through a return line 200 which empties into the lower end of the tank 12.

When the tank 12 is located indoors (FIG. 2), the collector pump 14 and the heating pump 20 may be located remote from the cabinet 190 that surrounds the tank. Moreover, because of space restrictions the storage tank 12 when located indoors may actually constitute several tanks which are connected together. This facilitates installation and maninentenance. The box-like configuration of each tank 12 and cabinet 190 lends itself to the most efficient utilization of indoor space.

The fan coil 16 at its ends is connected with the feed line 198 and return line 200, and is otherwise merely a water-to-air heat transfer device that is positioned ahead of the fan unit 6 for the furnace 2. Thus, any heat within the coil 16 is transferred to the air stream that is generated by the fan unit 6. In lieu of the fan coil 16, the heated water from the tank 12 may be directed through some other water-to-air heat transfer devices such as floor coils or conventional radiators.

The water preheater 18 closely resembles a conventional hot water heater in that it consists of a tank 202 (FIG. 1) having a cold water tap line 204 leading to it and a hot water line 206 emerging from it. However, instead of containing a burner or resistance type heating element to heat the water within the tank 202, the water preheater 18 has a coil 208 that is located within the bottom of the tank 202, this coil having its ends connected with the feed line 198 and return line 200 so that water can be circulated through it by the heating pump 20. The hot water line 206 emerging from the tank 202 of the water preheater 18 is connected with the inlet of the conventional water heater 8 and contains a shut-off valve 211, whereas the outlet of the water heater 8 is connected to the hot water supply line 212 for the building B. The supply line 212 is also connected with the hot water line 206 from the water preheater 18 through a bypass line 213 which contains a shut-off valve 214.

At least one of the collectors 10 on the front sheet 72 of its collector panel 70 is provided with a thermostat 215 (FIG. 5) which senses the temperature within the interior of the panel 70, that is within the channels 80 and 81. The thermostat 215 through appropriate electrical circuitry controls the collector pump 14 such that when the temperature within the panel 70 reaches a predetermined magnitude, the pump 14 will be energized and will circulate water from the storage tank 12 through the manifold 11 and the collectors 10. In so doing, the water will be heated within the collectors 10 and returned to the storage tank 12 at a substantially higher temperature. In this regard, sun's energy is absorbed at the coating 82 on the front face of the sheet 72, while the water that is to be heated is in the channels 80 and 81 located directly behind the sheet 72. Moreover the channels 80 and 81 occupy practically the entire surface area behind the sheet 72 and are spaced from the coating 82 by thickness of the metal for the sheet 72. That metal is a good conductor of heat, and as a consequence, a very efficient transfer of heat to the water results. The tank 12 also contains a sensor 216 which senses the temperature of the water within it, and the pump 14 will continue to circulate the water until the temperature differential between the water in the tank 12 and the water in the collector panels 70, as determined by the thermostat 215 and sensor 216, reaches a predetermined value, at which time the pump 14 will be de-energized. When this occurs, the channels 80 and 81 within the panels 70 drain into supply pipes 86, which in turn drain into the pipe 136 of the manifold 11. The pressure and return pipes 136 and 138 of the manifold 11 in turn drain back into the tank 12. Therefore, neither the collectors 10 nor the manifold 11 contain water which could freeze and damage them when the pump 14 is not in operation.

The furnace 2 is controlled by a thermostat 217 (FIG. 1) which is located in the building B, and this thermostat is also instrumental in the operation of the solar heating system A. Whenever the temperature of the water within the tank 12, as determined by the sensor 216, is above the temperature setting for the room thermostat 217 by a predetermined amount, such as 10° F., and the furnace fan unit 6 is in operation, the heating pump 20 will operate so as to circulate the warm water from the tank 12 through the heating coil 16 and thereby heat the air as it is drawn into the fan unit 6. The water will return to the tank 12 at a somewhat lower temperature through the return line 200. Of course, when the room thermostat 217 calls for heat and the water in the tank 12 is at a temperature capable of supplying that heat, or at least some of it, the valve 22 in that branch of the feed line 198 leading to the coil 16 is open so that the water flows into the fan coil 16. The pump 20 under these circumstances continues to operate for as long as the thermostat 217 calls for heat, provided the tank 12 is capable of supplying water at a suffciently high temperature to provide that heat. However, when the differential between the temperature of the air in the building B, as sensed by the thermostat 217, and the temperature of the water in the tank 12 as monitored by the sensor 216, falls below the predetermined value, such as 10° F., then the heating pump 20 is de-energized, and the entire heating load must be carried by the furnace 2.

Moreover, whenever the differential between the temperature of the water within the tank 12 and the temperature of the water within the preheater 18, as sensed by still another sensor 218 (FIG. 1), exceeds a predetermined amount, the pump 20 is likewise energized and the valve 22 in that branch of the line 198 leading to the preheater 18 is open so that the warm water in the feed line 198 flows into the coil 208 of the preheater 18. Hence, the water from the storage tank 12 heats the water within the water preheater 18, placing less demand on the conventional water heater 8. The pump 20 continues to operate in this condition until the differential between the water temperature of the tank 12 and the water temperature of the preheater 18 falls below a predetermined value, such as 10° F. Normally when the heating pump 20 operates to direct water through the feed line 198, both valves 22 and 24 are open so the heated water circulates through both the fan coil 16 and the coil 208 of the preheater 18. However times will occur even during the winter months when the tap water will require heat and the building air will not or vice-versa, and the valves 22 and 24 in the feed line 198 are opened and closed accordingly.

During summer months when the air within the building B requires no heat, the solar heating system A still remains useful, for it provides a continuous source of heat for the tap water within preheater 18. Under these circumstances the heating pump 20 is under the control of the temperature sensor 218 for the preheater 18, and remains in operation long enough to maintain the temperature of the water in the preheater 18 at the predetermined value. Usually the setting is high enough to eliminate the need for the hot water heater 8 altogether, and in these circumstances the valve 214 in the bypass line 213 is opened, while the valve 211 in the hot water line 206 is closed. Hence the heated water from the preheater 18 flows directly into the hot water supply line 212. Of couse, under these circumstances the valve 24 leading to the preheater 18 is open while the valve 22 leading to the fan coil 16 is closed.

When the storage tank 12 is located outdoors (FIG. 1), the heating pump 20 also serves to protect the storage tank 12 during long periods of subfreezing temperatures without adequate sunlight to warm the collector panels 70, for the pump 20 is capable of transferring heat from the building B to the tank 12 to prevent the water in the tank 12 from freezing. In this regard, whenever the thermostat 216 detects that the temperature of the water within the tank 12 has approached the freezing temperature, it causes the heating pump 20 to be energized with the valve 22 set to direct the water of the tank 12 through the heating coil 16. The water extracts heat from the airstream passing into the furnace 2, and this heat is delivered to the tank 12 where it maintains the water of the tank 12 above the freezing temperature. Normally, under these circumstances the furnace 2 is operated to prevent the air within the building B from becoming too cold.

When installing the collectors 10 on the roof 26 (FIG. 2), the manifold 11 is first attached to the roof 26 in a horizontal disposition by suitable fastening devices, such as wood screws, which are inserted through the mounting brackets 132. Then the coupling and metering bushings 106 and 154 are inserted into the lower ends of the pipes 86 for collectors 10 of the first tier. Each collector 10 is then manually maneuvered into a position with its bushings 106 and 154 aligned with a pair of drain and supply fittings 150 and 146, respectively, on the manifold 11, whereupon the collector 10 is forced toward the manifold 11 until the bushings 106 and 154 are fully inserted into their respective fittings 150 and 146. The collectors 10 of the first tier are thereafter secured firmly to the roof 26 at their mounting brackets 60. The remaining tiers of collectors 10 are installed in the same manner, with the drain and supply pipes 86 for adjacent collectors 10 in each column being joined together by more coupling and metering bushings 106 and 154, or in the case of the last tier by merely coupling bushings 106.

Where the collectors 10 are to be installed on the tower 28 (FIG. 3), the manifold 11 is secured at its brackets 132 to the lower end truss 40 of the support frame 36 on the tower 28. The collectors 10 may then be maneuvered into position in the same manner as if they and the manifold 11 were on the roof 26.

The tower 24, however, inasmuch as its frames 36 will pivot about the trunnions 44, affords a somewhat simpler and quicker procedure for installation. In this procedure, the manifold 11 is installed on the lower end truss 40 for the frame 36 as previously described. Then the frame 36 is rotated about its trunnions 44 to bring the manifold 11 into the upper position on the frame 36, in which position the supply and drain fittings 146 and 150 project generally downwardly. The frame 36 is secured in this position with its front face at about 60° with respect to the horizontal. Thereupon, a lifting apparatus 220 (FIGS. 10-12) is laid over the front of the frame 34 to lift the collectors 10 upwardly and maneuver them into their proper positions.

Figure 10:
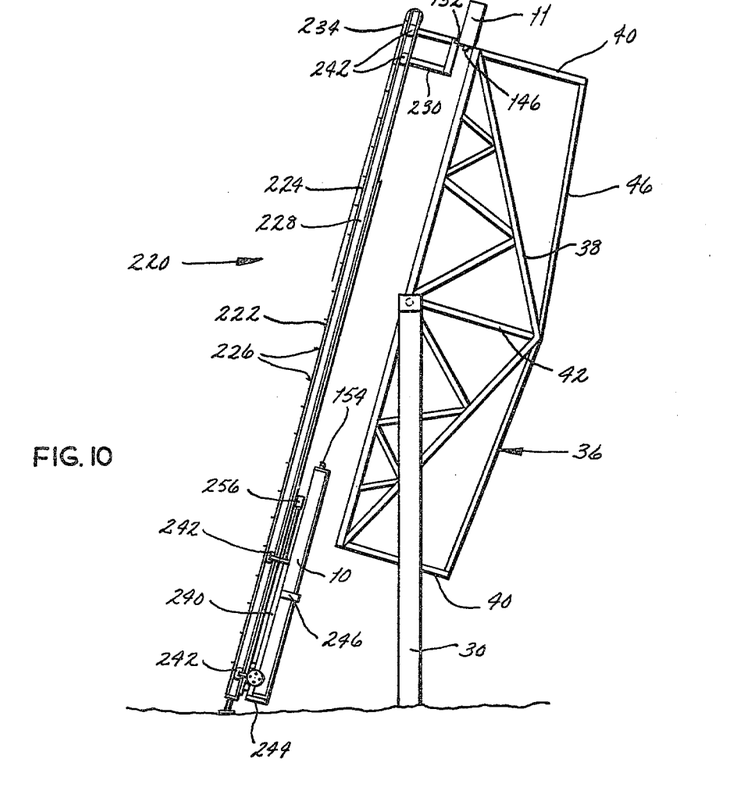
FIG. 10 is a side elevational view showing the lifting apparatus for installing collectors upon the frame of the towers, and further showing a collector on the apparatus.
Figure 11:
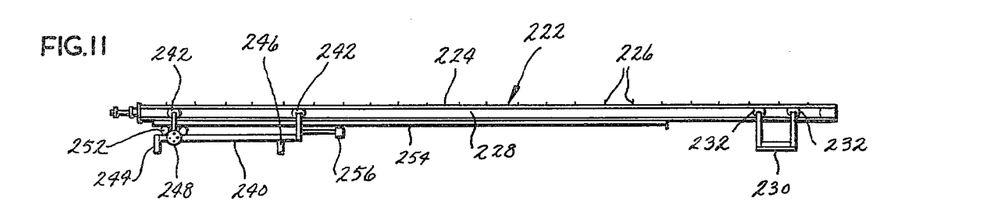
FIG. 11 is a side elevational view of the lifting device.
Figure 12:
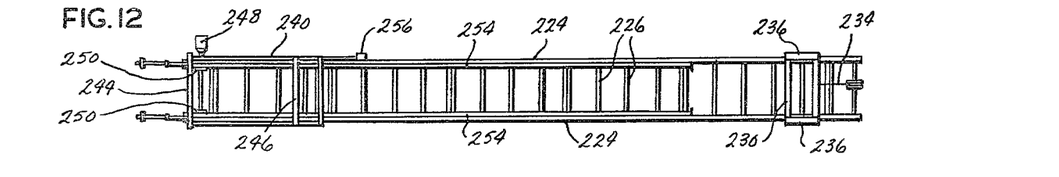
FIG. 12 is a rear elevational view of the lifting apparatus.

The lifting apparatus 220 resembles a ladder in appearance, and indeed it includes a ladder 222 composed of a pair of side rails 224 joined together by rungs 226. Each side rail 224 along its outwardly presented surface has a pair of channels 228 which open toward each other. At the upper end of the ladder 222 the lifting apparatus 220 is provided with a positioning carriage 230 which along its sides has wheels 232 that roll in and are guided by the channels 228 of the side rails 224, thereby enabling the carriage 230 to move upwardly and downwardly on the ladder 222, it being controlled and manipulated by a cable 234 that extends along the ladder. The positioning carriage 230 also has a pair of pockets 236 which open away from the ladder 222 and are sized to receive the outwardly projecting ends of the mounting brackets 132 on the manifold 11. Moreover, the pockets 236 are spaced apart a distance equal to the spacing between the mounting brackets 132 at corresponding supply and drain fittings 146 and 150 on the manifold 11. This enables the positioning carriage 230 to be engaged at its pockets 236 with any pair of mounting brackets 132 on the manifold 11. To emplace the ladder 222, the positioning carriage 230 is moved upwardly or downwardly until its pockets 236 are located directly opposite a pair of brackets 132 in the manifold housing 122, whereupon the ladder 222 is tilted forwardly until the carriage 230 at its pockets engages the brackets on the manifold 11. This stabilizes the upper end of the ladder 222 and positions the entire ladder 222 outwardly, that is forwardly, from the front of the tower frame 36.

In addition, the lifting apparatus 220 also includes a hoisting carriage 240 which, like the positioning carriage 230, has wheels 242 which are received in the channels 228 of the side rails 224 such that they roll along and are guided by those channels. The carriage 240 likewise extends across the ladder 222 and faces the front of the support frame 36 for the tower 24. The carriage 240 is about one-half the length of the collectors 10 and at its lower end is fitted with a pusher bar 244 that projects toward the support frame 36. At its upper end, the carriage 240 has a strap 246 for securing a collector 10 to it with one end of the collector 10 resting on the pusher bar 244. Along its one side, the hoisting carriage 240 is fitted with a gear motor 248 which projects no further forwardly than the front face of the carriage 240, and this motor drives a pair of sprockets 250 which engage roller chains 254 that extend along the sides of the ladder 222 and are secured at both ends to the side rails 224 for the ladder 222. The chains 254 loop around idler sprockets 252 which maintain the chain 254 parallel with the edges of the side rails 224 along which they extend and further align the chains 254 with their respective drive sprockets 250. Thus, when the motor 248 is energized to rotate the drive sprockets 250, the drive sprockets 250 crawl along the chains 254, moving the hoisting carriage 240 with it. The motor 248 is controlled by a switch 256 which is mounted upon the upper end hoisting carriage 240 to the side of the ladder 222 where it is accessible to a workman on the ladder 222.

In use, the lifting apparatus 220 is positioned over the front of the inverted, yet inclined, tower frame 36, with the pockets 236 of the positioning carriage 230 engaged with a pair of mounting brackets 132 on the manifold housing 122. This centers the ladder 222 between corresponding supply and drain fittings 146 and 150 on the manifold housing 122. Then a collector 10 is loaded onto the hoisting carriage 240, but only after the appropriate bushings 106 and 154 have been inserted into the ends of its pipes 84. The collector 10 rests on the pusher bar 244, and is prevented from toppling off by the strap 246, which fits around the collector 10 midway between it ends. A workman then climbs the rungs 226 of the ladder 222 and as he does, he operates the switch 256 so that the hoisting carriage 240 moves upwardly with him. As the upwardly presented end of the collector 10 nears the manifold 120, the workman manually maneuvers it to align the protruding metering bushings 154 and coupling bushings 106 with the supply fittings 146 and drain fittings 150 so that upon further advance by the motor 248, the metering bushing 154 is forced into the supply fitting 146 while the coupling bushing 106 is forced into the drain fitting 150. Thereupon, the collector 10 is secured to the support frame 36 at its mounting brackets 60.

The remaining collectors 10 are installed in a similar manner, and when all are in place and secured to the tower frame 36, the lifting apparatus 220 is removed and the tower frame 36 is returned to its operative position.

The lifting apparatus 220 may also be used to install collectors 10 on a tower frame 36 that has not been inverted. In this case, the positioning carriage 230 is aligned with and brought to rest against the upper of the two end trusses 40, and the hoisting carriage 240 is used to elevate the collectors 10 onto the frame 36.

Instead of supplying the heat for a building, the collectors 10, manifold 11 and tank 12 may be used to provide heat for just about any application requiring heat at a temperature capable of being derived from the collectors 10.

This invention is intended to cover all changes and modifications of the example of the invention herein chosen for purposes of the disclosure which do not constitute departures from the spirit and scope of the invention.

What is claimed is:

1. For use in a solar heating system, the combination comprising: at least one solar collector having its one end mounted higher than its other end and including a surface that is capable of absorbing a substantial amount of heat from the rays of the sun, means for enclosing a cavity behind the heat absorbing surface with the cavity being capable of holding a heat transfer fluid, a supply pipe extending along the cavity-enclosing means and having its ends easily accessible at the upper and lower ends of the collector, the supply pipe having its interior in communication with the lower region of the cavity, and a drain pipe extending along the cavity enclosing means and having its ends easily accessible at the upper and lower ends of the collector, the drain pipe having its interior in communication with the cavity at the upper region of the cavity; a manifold located below and adjacent to the lower end of the collector and including a pressure pipe having a supply fitting, and a return pipe located alongside the pressure pipe and having a drain fitting; and first coupling means for connecting the supply pipe of the collector and the supply fitting of the manifold and second coupling means for connecting the drain pipe of the collector and the drain fitting of the manifold, all to enable the heat transfer fluid to flow from the pressure pipe of the manifold, through the cavity of the collector where it is heated, and thence into the return pipe of the manifold, the first and second coupling means being detachable from the collector and further being configured to enable the respective pipes and fittings that they connect to be joined together and taken apart by moving the collector with respect to the manifold, whereby the collector may in effect be plugged into the manifold and also another collector of similar construction may be plugged into the said one collector at the upper end thereof to communicate with the pressure and return pipes of the manifold through the supply and drain pipes of said one collector.

2. The combination according to claim 1 wherein the supply and drain pipes of the collector are straight and parallel.

3. The combination according to claim 1 wherein the first coupling means presents a greater restriction to the flow of the heat transfer fluid than the second coupling means.

4. The combination according to claim 1 wherein the first and second coupling means comprise bushings which slip-fit into sealing engagement with the supply and drain pipes of the collector and with the supply and drain fittings of the manifold.

5. The combination according to claim 1 wherein the supply pipe and the drain pipe for each collector extend substantially the full height of the collector, and at their ends remote from the manifold are connected respectively to the supply and drain pipes of another collector to form a column of collectors.

6. The combination according to claim 5 wherein the first coupling means contains means for metering the flow of heat transfer fluid to the cavity of the lower collector and to the other collectors in the column.

7. The combination according to claim 1 wherein the pressure pipe and the return pipe of the manifold are inclined downwardly with respect to the horizontal so that the heat transfer fluid will drain toward one end of the manifold.

8. The combination according to claim 1 wherein the solar collector comprises: front and back metal sheets joined together at a fluid-tight joint and spread slightly apart in the area circumscribed by the joint so as to form the cavity for holding the heat transfer fluid, the heat absorbing surface being on the front sheet; the supply and drain pipes being extended along the joined together sheets for the full height thereof, and supply and drain ports connecting the interiors of the supply and drain pipes, respectively, with the cavity of the collector, such that the supply port opens into the interior of the supply pipe and into one end of the cavity and the drain port opens into the interior of the drain pipe and into the other end of the cavity.

9. The combination according to claim 8 wherein the supply and drain pipes are located behind the back sheet, and the ports open into the cavity through the back sheet.

10. The combination according to claim 1 wherein at least two collectors are arranged in a column, with the supply and drain pipes of the lowermost collector being connected respectively to the supply and drain fittings of the manifold and the supply and drain pipes of the next collector being connected respectively to the supply and drain pipes of the lowermost collector; and wherein the supply ports of the collectors are located at the lower ends of the joined together sheets and the drain ports are at the upper ends of the joined together sheets.

11. The combination according to claim 8 wherein the joined together sheets are rectangular and the sheets are welded together along their peripheries to form the fluid-tight joint and are also welded together within the area circumscribed by the joint.

12. The combination according to claim 11 wherein the welds within the area circumscribed by the fluid-tight joint are spaced such as to enable the panel to withstand a pressure within its cavity of 8 lbs./in.$^2$ without significant distortion.

13. The combination according to claim 1 and further comprising upright supporting members, a frame mounted upon the supporting members such that it can pivot about a generally horizontal axis, the solar collector and the manifold being mounted upon the frame, and means for circulating a heat transfer fluid through the solar collector, whereby the inclination of the frame can be altered to provide optimum exposure of the collector to the sun.

14. The combination according to claim 13 wherein the manifold has a plurality of supply and drain fittings, and wherein a plurality of collectors are connected to the manifold at its supply and drain fittings.

15. The combination according to claim 14 wherein the collectors are slip fitted together with the manifold at fluid-tight joints.

16. The combination according to claim 14 wherein the collectors are arranged in columns and tiers upon the frame, and the collectors of the lower most tier are connected directly to the manifold, while the collectors of higher tiers are connected to the manifold through the collectors located beneath them in their respective columns.

17. The combination according to claim 14 wherein the manifold further includes a housing enclosing the supply and drain lines; and thermal insulation within the housing to retard loss of heat from the supply and drain lines.

18. The combination of claim 13 wherein the frame includes parallel members which extend horizontally and lie in the same plane, and wherein the collector bridges the spaces between the members and is attached at its ends to the members.

19. The combination according to claim 18 wherein each member forms part of a truss.

20. For use in a solar heating system, the combination comprising: a pressure pipe for conveying heat transfer fluid and having an outlet fitting; a return pipe located adjacent to the pressure pipe for likewise conveying the heat transfer fluid and having an inlet fitting; a first solar collector located above the pressure and return pipes and including a housing having upper and lower ends, means defining a cavity for holding the heat transfer fluid within the housing, said means having a heat absorbing surface which is exposed outwardly through the housing so that it may be presented toward the sun to absorb heat from the sun, a supply pipe extending from one end of the housing to the other end and having its interior in communication with the cavity, and a drain pipe extending from one end of the housing to the other end and having its interior in communication with a region of the cavity that is remote from the region with which the supply pipe communicates; first coupling means for connecting the outlet fitting of the pressure pipe with the lower end of the supply pipe for the first solar collector and for further proportioning the flow of the heat transfer fluid that flows out of the outlet fitting of the pressure pipe such that some of the fluid is diverted into the cavity of the first collector while the remainder is directed into the supply pipe of the first collector; second coupling means for connecting the drain fitting of the return pipe with the lower end of the drain pipe for the first solar collector; a second solar collector located above the first solar collector and including a housing having upper and lower ends, means defining a cavity within the housing, said means having a heat absorbing surface which is exposed outwardly through the housing so that it may be presented toward the sun to absorb heat from the sun, a supply pipe having one end opening out of the lower end of the housing and further having its interior in communication with the cavity, and a drain pipe having one end opening out of the lower end of the housing and further having its interior in communication with the cavity at a location remote from the location at which the supply pipe communicates with the cavity, the spacing between supply and return pipes at the lower end of the second solar collector being equal to the spacing between the supply and drain pipes of the first collector at the upper end of the first collector; third coupling means for connecting the upper end of the supply pipe for the first collector to the lower end of the supply pipe for the second collector so that the remainder of the heat transfer fluid that is directed into the supply pipe of the first collector passes through the third coupling means and into the supply pipe of the second collector, where at least some of it will flow into the cavity of the second collector, the proportioning at the first coupling means being such that the flow rates of the fluid through the cavities of the first and second collectors are similar; and fourth coupling means for connecting the upper end of the drain pipe for the first collector to the lower end of the drain pipe for the second collector.

21. The combination according to claim 20 wherein the first and second coupling means enables the first collector to, in effect, be plugged into the respective fittings of the pressure and return pipes, and the third and fourth coupling means enable the second collector to be plugged into the first collector.

22. The combination according to claim 21 wherein the first and second coupling means fit into and frictionally engage the inwardly presented walls of the pipes and fittings that they connect, and the third and fourth coupling means fit into and frictionally engage the surfaces of the walls of the pipes that they connect.

23. The combination according to claim 20 wherein the first and second solar collectors are identical and interchangeable with each other.

24. The combination according to claim 23 wherein each collector housing is rectangular, and the supply and drain pipes of each collector are parallel.

25. The combination according to claim 20 wherein the interior of the supply pipe for the first solar collector communicates with the cavity of the first collector through a port; and wherein the first coupling means comprises a bushing having a first sealing portion that is sealed against the interior of the supply pipe for the first collector above the port, a second sealing portion that is sealed against the interior of the supply pipe for the first collector below the port, a connecting portion that extends between the first and second sealing portions, but is of lesser diameter so that a space exists between the wall of the supply pipe and the connecting portion, the bushing further having a common passageway that extends through the two sealing portions and the connecting portion and is in communication with the interior of the supply fitting on the pressure pipe, the bushing in addition having an orifice located in the connecting portion to provide communication between the passage and the space surrounding the connecting portion, whereby the heat transfer fluid will flow through the orifice to the cavity of the first collector and out of the upper end of the passage to the cavity of the second collector.

26. The combination according to claim 20 and further comprising another housing encasing the pressure and return pipes, and wherein the pressure and return pipes within the other housing slope downwardly away from the fittings thereon.

27. For use in a solar heating system, the combination comprising: at least two solar collectors arranged in a column with one being generally above the other, each collector being positioned such that it has its one end located higher than its other end, each collector including front and back metal sheets joined together at a fluid-tight joint and spread slightly apart in the area circumscribed by the joint so as to form a cavity for holding a heat transfer fluid, a heat absorbing surface on the front sheet, with the surface being capable of absorbing a substantial amount of heat from the rays of the sun, a supply pipe extending along the joined-together sheets for the full height thereof and having its end easily accessible at the ends of the collector, a supply port connecting the interior of the supply pipe with lower end of the cavity, and a drain pipe extending along the joined-together sheets for the full height thereof and having its ends easily accessible at the ends of the collector, a drain port connecting the interior of the drain pipe with the upper end of the cavity, the supply pipe of the lower collector being connected with the supply pipe of the upper collector and the drain pipe of the lower collector being connected to the drain pipe of the upper collector, with the connections being such that the upper collector is in effect plugged into the lower collector; a manifold including a pressure pipe having a supply fitting and a return pipe located alongside the pressure pipe and having a drain fitting; and first coupling means for connecting the supply pipe of the lower connector with the supply fitting of the manifold and second coupling means for connecting the drain pipe of the lower collector with the drain fitting of the manifold, all to enable the heat transfer fluid to flow from the pressure pipe of the manifold, through the cavities of the collectors where it is heated, and thence into the return pipe of the manifold, the coupling means being configured to enable the pipes of the lower collector and the fittings of the manifold to be joined together and taken apart by moving the lower collector with respect to the manifold, whereby the lower collector may in effect be plugged into the manifold, the first coupling means, which joins the supply pipe of the lower collector to the supply fitting of the manifold, comprising a metering bushing having a lower portion that engages the supply fitting of the manifold, spaced apart intermediate and upper portions which fit into the supply pipe of the lowermost collector and a connecting portion which joins the intermediate and upper portions but is narrower than those portions, the metering bushing further having a passage extending through all of the portions from one end of the bushing to the other, the metering bushing also having an orifice in the connecting portion with the orifice providing communication between the passage and the space surrounding the connecting portion, the length of the intermediate and connecting portions being such that when the bushing is properly installed in the supply pipe of the lower collector, the intermediate portion will be below the supply port that opens into the supply pipe and the upper portion will be located above that supply port, so that the cavity of the lower collector is supplied with heat transfer fluid only through the orifice, while the cavity of the upper collector in the column is supplied with heat transfer fluid that passes out of the upper end of the passage and through the supply pipe of the lower collector.

28. The combination according to claim 1 wherein the manifold further includes a housing in which the pressure and return pipes are contained.

29. The combination according to claim 28 wherein the pressure and return pipes slope downwardly toward one end of the housing to permit the heat transfer fluid to drain completely from them.

30. The combination according to claim 30 wherein the manifold further includes insulation that lines the housing.

31. The combination according to claim 1 wherein the collector is rectangular and the manifold is generally parallel to the lower end of the collector.

32. The combination according to claim 27 wherein the second coupling means, which joins the drain pipe of the lower collector to the drain fitting of the manifold, comprises a coupling bushing having upper and lower portions which fit into the drain pipe of the collector and drain fitting of the manifold, respectively, the coupling bushing further having a passage extending from its one end to its other end with the passage being at least as large in cross-section as the passage extending through the metering bushing.

33. The combination according to claim 27 wherein the upper, intermediate, and lower portions of the metering bushing are circumscribed by elastomeric seals which bear against the inside surfaces of the supply pipe and supply fitting to form fluid-tight seals therewith, and the lower and intermediate portions are separated by a shoulder portion of greater diameter than the lower and intermediate portions.

34. The combination according to claim 27 wherein the metering bushing has another orifice located in the passage upwardly from the orifice in the connecting portion, and the passage opens into the remainder of the supply pipe through the other orifice.

35. The combination according to claim 27 wherein the supply pipes of two adjacent collectors in a column are joined together by another metering bushing such that the heat transfer fluid for the upper of the two joined together collectors passes through the orifice in the connecting portion of the other metering bushing.

* * * * *